Dec. 3, 1968

M. MERZ 3,414,026

CHAIN SAW SHROUD STRUCTURE

Filed Oct. 4, 1965

Inventor:
Max Merz
By: Evan D. Roberts Atty.

Dec. 3, 1968
M. MERZ
3,414,026
CHAIN SAW SHROUD STRUCTURE
Filed Oct. 4, 1965
2 Sheets-Sheet 2
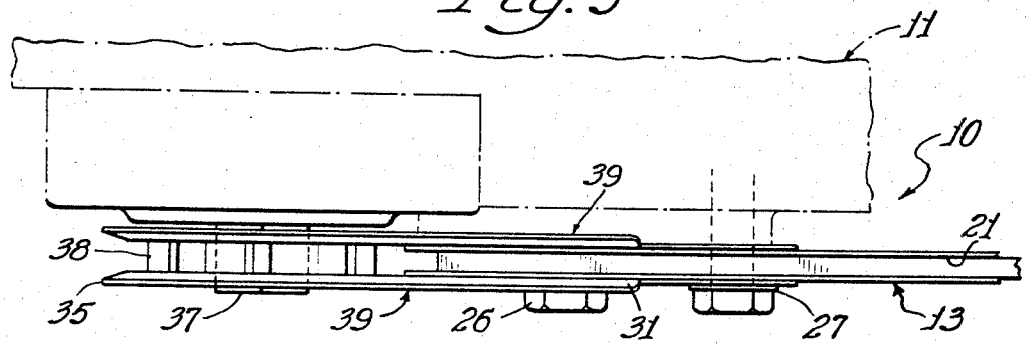
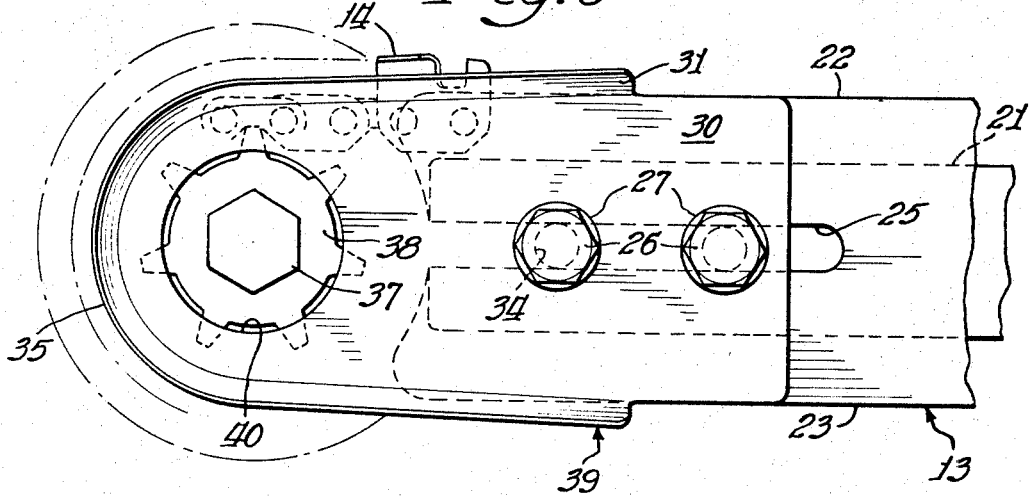
Inventor:
Max Merz
By: Evan D. Roberts
Atty.

United States Patent Office 3,414,026
Patented Dec. 3, 1968

3,414,026
CHAIN SAW SHROUD STRUCTURE
Max Merz, Los Angeles, Calif., assignor, by mesne assignments, to Nicholson File Company, East Providence, R.I., a corporation of Rhode Island
Filed Oct. 4, 1965, Ser. No. 492,396
14 Claims. (Cl. 143—32)

ABSTRACT OF THE DISCLOSURE

A chain saw structure including a shroud or guide at that end of the chain saw bar adjacent the sprocket and comprising plates adjustably secured to the bar at opposite sides thereof, said bar being adjustably secured to the chain saw power unit, the arrangement being such that as the bar is adjusted relative to the sprocket, to compensate for variations in chain length, the relation between the shroud and the sprocket may remain constant, thus preserving the proper geometric relationship between the chain and sprocket as the former passes to, around and from the latter.

---

This invention relates to an improved chain saw structure, and in particular, to a chain saw having a novel guide or shroud structure for guiding the chain around the drive sprocket and end of the bar thereof.

It is a common procedure in the chain saw art to provide a chain saw having a power unit which drives a sprocket that in turn drives a saw chain in a groove in the edges of a chain saw bar. The bars are commonly secured to the unit so that the bar becomes part of the unit. However, inasmuch as a chain saw chain will become elongated in use due to wear and yielding of the elements thereof under load, there is a need for a structure which will allow an adjustment of the position of the bar with respect to the driving sprocket. The slack in the chain resulting from elongation thereof can thereby be taken up by the adjustment of the bar on the unit with respect to the sprocket.

The presently existing structures, which provide some sort of slack take-up adjustment, typically result in an inappropriate initial geometeric relationship between the sprocket, the bar, and the chain and/or a varying and consequently inappropriate resulting geometrical relationship between these elements as the slack take-up adjustments are made. In particular, a typical structure is one wherein a slot is provided in the bar to allow the sprocket shaft to move longitudinally within the bar as the bar is adjustably moved from time to time to take up the slack in the chain.

As the take-up adjustments are made in this type of structure, the chain is passing around a groove which may or may not originally be concentric with the axis of the sprocket, but which as the adjustments are made, will certainly not remain concentric therewith. Thus, as the adjustments are made, the reaction of the chain with the sprocket and the edge of the bar will be constantly changing with a resulting change in the geometrical relationship therebetween.

Accordingly, the chain will tend to move with varying depth in the bar and sprocket in the end of the bar adjacent the sprocket as it passes around the sprocket. The varying depths will be repositioned on the bar and changed in dimension as the adjustments are made. Under these circumstances, it is impossible to maintain a substantially constant optimum guiding relationship between the sides of the bar adjacent the sprocket, and the sprocket and chain, with the result that the chain will either tend to ride out of the groove in the sprocket or be drawn more deeply thereinto causing a loss of engagement contact between the sprocket and the chain, or extreme friction between the chain, bar and sprocket to the point wherein the chain will become thrown from the bar and/or broken.

It is, therefore, extremely important to be able to provide a chain saw structure, wherein the bar thereof is adjustable with respect to the drive unit to take up slack in the chain and wherein this structure is provided with a shroud or guide for the drive sprocket and chain to uniformly guide the chain from the groove in one edge of the bar around the end of the bar and into the groove on the other edge of the chain in a manner that is consistent throughout the all slack adjustment of the bar with respect to the drive unit.

It is, therefore, a primary object of this invention to provide an improved saw chain structure having a shroud for uniformly guiding a chain in a bar groove adjacent the chain drive sprocket in a consistent manner independent of the adjusted position of the bar with respect to the drive unit and the sprocket.

It is a further object of this invention to provide an improved saw chain structure having a shroud for uniformly guiding a chain in a bar groove adjacent the chain drive sprocket which is highly reliable and relatively simple and inexpensive to manufacture and maintain.

With these and other objects in view, the present invention provides an improved saw chain structure having a sprocket driven chain actuated by a power unit with a saw bar adjustably secured to the power unit, and a shroud positioned adjacent the sprocket at the end of the bar and positioned in fixed relationship with respect to the sprocket and independently with respect to the end of the bar to provide a uniform and consistent guide for the chain around the bar adjacent the end of the sprocket and independently of the adjusted position of the bar with respect to the unit.

Other objects, advantages and novel aspects of the invention will become apparent upon consideration of the following detailed description, in conjunction with the accompanying drawings wherein:

FIG. 5 is a partial top view showing the shrouds in guiding positions with respect to the chain, sprocket, and saw bar of the second embodiment of this invention; and FIG. 6 is a partial side view showing the inter-relationship of the structure of the second embodiment of this invention.

Figure 1:
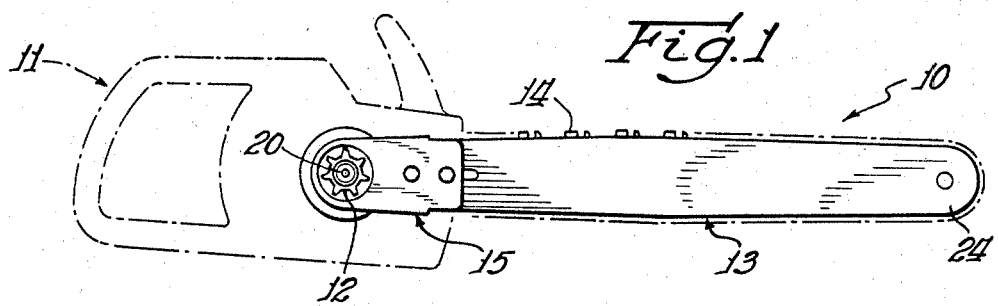
FIG. 1 is a general view of a chain saw bar showing the general position and use of the improved structures provided by this invention.

Referring to FIG. 1, there is illustrated a chain saw structure generally designated by the numeral 10, which is provided generally with a drive unit 11, a drive sprocket 12, a bar 13, a saw chain 14, and shroud guide plates 15.

The sprocket 12 is secured to a shaft 20 that is rotated by the drive unit 11. Although the sprocket 12 may be fastened to the shaft 20 in several ways, the common arrangement is to have the sprocket secured both circumferentially and axially on said shaft 20. However, it is also appropriate to circumferentially key the sprocket 12 to the shaft 20, leaving it free to move axially thereon and thereby be a floating sprocket. The bar 13 is provided with a groove or grooves 21 in the longitudinally upper or lower edges 22 and 23 thereof, and extends around the outer end 24 thereof. The bar 13 is further provided with a longitudinal aperture 25 through the inner end portion of the bar. The bar 13 is thus adapted to receive machine screws 26 which are threadably mounted in the side of the drive unit 11 adjacent the sprocket 12.

The shroud plates 15 have a central portion 30 in respective parallel engagement with the side of the bar 13 over the apertures 25 therein, and are provided with guide flanges 31 which are curved away from the plane of the central portion 30 in the area adjacent the slot 25. This outwardly curved flange portion 31 diminishes toward the inner or left end of the shrouds (FIGS. 2 and 3) in a circular end surface 35 that is substantially concentric with the opening 33. The end surface 35 extends substantially in the plane of the central portion 30.

An inwardly extending annular embossment 32 is provided on the inside of the shrouds 15 around an opening 33. The shrouds are provided with apertures 34 therein which are in longitudinal registry with the elongated aperture 25 in the inner end of the bar 13, and are adapted to receive the machine screws 26 so that the shrouds 15 and the bar 13 are secured to the unit 11 when the machine screws 26 are tightened. The apertures 34 are positioned in the shrouds 15 so that the opening 33, guide embossment 32, and the circular end surface are substantially concentric with the axis of rotation of the shaft and the sprocket.

It should be noted that the bar 13 can be adjustably positioned with respect to the drive unit by loosening the machine screws 26, and moving the bar 13 longitudinally on the machine screws which are positioned in the aperture 25, so that the tension of the chain 14 between the sprocket 12 and the bar 13 may thereby be adjusted. Also, it should be noted that during any such adjustment, the geometrical relationship between the shroud plates 15 and the sprocket 12 carrying the chain 14 remains substantially unaltered. Thus, the bar 13 may be adjusted to take up slack in the chain 14, while the shrouds 15 maintain a consistent guide effects on the chain 14, as the chain passes around the sprocket 12 from the groove 21 in one edge of the bar 13 to the groove 21 in the other edge thereof.

A second embodiment of the invention is illustrated in FIGS. 5 and 6 and is substantially similar to the first embodiment of the invention. In particular, the second embodiment of the invention is applied to the chain saw structure 10 which has the drive unit 11, bar 13, and saw chain 14. This embodiment of the invention is provided with a modified sprocket 38 and shroud guide plates 39.

The second embodiment is particularly applicable to the floating sprocket type drive wherein the sprocket 38 is free to move axially in splined engagement with the drive shaft 37, as explained above, and is adapted to be substantially retained against axial movement on the shaft 37 by modified shrouds 39. The bar 13 is provided with the groove or grooves 21 in the longitudinally upper and lower edges 22 and 23 thereof and extend around the outer end 24 (FIG. 1) of the bar 13. The bar 13 is further provided with the longitudinal aperture 25 through the inner end portion of the bar. The bar 13 is thus adapted to receive machine screws 26 having washers 27 which are threadably mounted in the side of the drive unit 11 adjacent the sprocket 38.

The shroud plates 39 have the central portion 30 in parallel engagement with the side of the bar 13 over the apertures 25 therein, and are provided with the tapered guide flanges 31 which are curved outwardly from the plane of the central portion 30 in the area adjacent the slot 25. This outwardly curved flange portion 31 tapers toward the inner or left end of the shrouds (FIGS. 2 and 3) in a circular end surface 35 that is designed to be substantially concentric with the opening 40. The end surface 35 extends substantially in the plane of the central portion 30.

Figure 2:
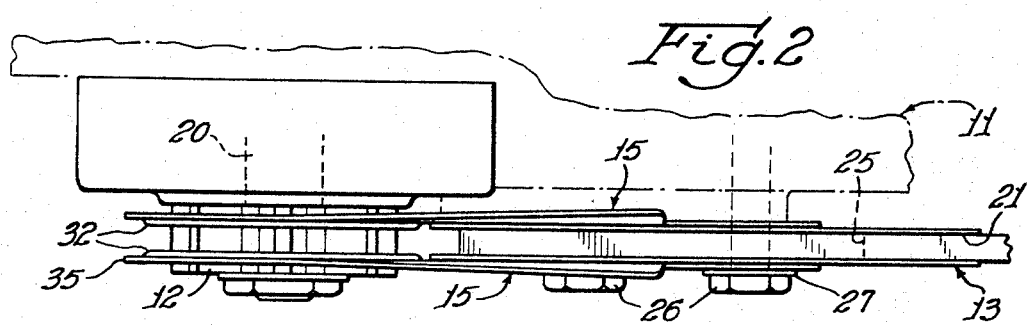
FIG. 2 is a partial top view showing the shrouds in guiding positions with respect to the chain, sprocket, and saw bar of the first embodiment of this invention.
Figure 3:
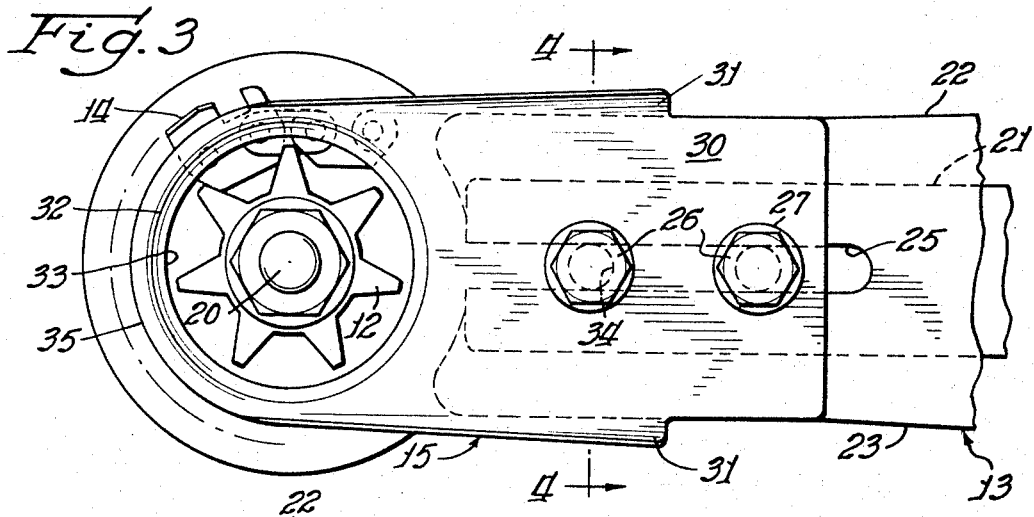
FIG. 3 is a partial side view showing the inter-relationship of the structures of the first embodiment of this invention.
Figure 4:
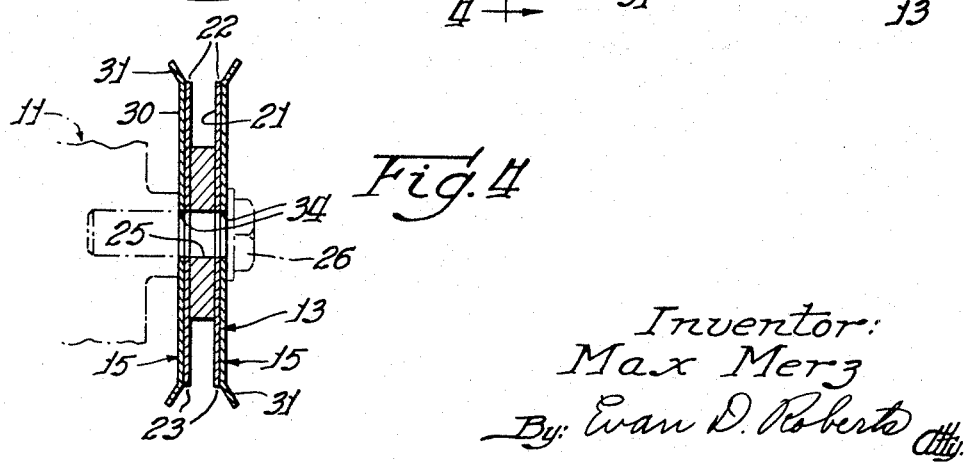
FIG. 4 is a partial sectional view taken along line 4—4 of FIG. 3 showing the inter-relationship between the chain and the shrouds of the first embodiment of this invention.

Thus, the shroud plates 39 of this modification of the invention are substantially identical with the shroud plates 15 of the first embodiment of the invention illustrated in FIGS. 1–3, except that an opening 40 is smaller than the opening 33 to the extent of being less than the diameter of the sprocket 38 to thereby retain the sprocket axially between the shrouds 39. Also, the embossments 32 of shrouds 15 of the first embodiment of the invention are omitted in this illustrated variation of the invention.

It should be noted that the shrouds 39 provide the substantially consistent geometric advantages in the guiding of the chain 14 as do the shrouds 15 of the first embodiment of this invention, and in addition thereto, axially retain the floating sprocket 38.

It is to be understood that the invention is not to be limited to the specific constructions and arrangements shown and described, except only insofar as the claims may be so limited, as it will be understood to those skilled in the art that changes may be made without departing from the principles of the invention.

What is claimed is:

1. An improved chain saw structure comprising a power unit having a drive shaft, a sprocket driven by said shaft, a saw chain driven by said sprocket, a saw bar terminating at one end adjacent said sprocket and said unit having a groove in opposite edges thereof for receiving said saw chain, said bar being adjustably secured to said unit to vary the radial position thereof with respect to said sprocket, a pair of shroud plates positioned on opposite sides of said bar and extending beyond said opposite edges in the area adjacent said sprocket, said shroud plate being secured to said unit in substantially fixed relationship with respect to said sprocket and axially adjacent the periphery thereof, said plates cooperating to define a guide for said chain from the bar groove on one edge of said bar and around said sprocket into the groove in the other edge of said bar, and means for securing said bar and said plates to said unit.

2. A chain saw structure as defined in claim 1, wherein the bar is formed with an elongated aperture through the end thereof adjacent said sprocket to receive a means for securing said bar to said unit for a longitudinally adjustable relation therebetween.

3. A chain saw structure as defined in claim 2, wherein the shroud plates are formed with apertures therethrough in registry with the aperture in said bar to receive a means for securing said bar to said unit and in fixed relation with respect to said sprocket.

4. A chain saw structure as defined in claim 1, wherein said shroud plates extend beyond said terminating end of said bar and entirely around the periphery of said sprocket and for a radial distance with respect to the periphery thereof to guide the chain as set forth.

5. A chain saw structure as defined in claim 1, wherein said sprocket is axially and circumferentially fixed to said shaft to be driven thereby and said shroud plates are each provided with apertures adjacent said sprocket for receiving same therethrough.

6. A chain saw structure as defined in claim 1, wherein said sprocket is axially free to move on said shaft and is circumferentially fixed thereto to be driven thereby and said shroud plates are provided with apertures therethrough for receiving said drive shaft therethrough but not said sprocket to axially retain said sprocket on said drive shaft between said shroud plates.

7. A chain saw structure as defined in claim 5, wherein said shroud plates are provided with an embossment projecting from facing surfaces thereof and around said apertures adjacent said sprocket to receive and guide said chain as set forth.

8. A chain saw structure as defined in claim 1, wherein each said shroud plate has flange edges extending beyond the grooved edges of said bar and away from the similarly extending adjacent edges of the other shroud plate.

9. A chain saw structure as defined in claim 8, wherein said extending flange edges are tapered toward the portion of said shroud plates adjacent said sprocket.

10. A chain saw structure as defined in claim 3, wherein said securing means is a threaded clamping element positioned in the apertures in said shroud plates and the elongated aperture in said bar and threaded into said unit.

11. A chain saw structure as defined in claim 10, wherein said shroud plates extend beyond said terminating end of said bar and entirely around the periphery of said sprocket and for a radial distance with respect to the periphery thereof to guide the chain as set forth.

12. A chain saw structure as defined in claim 8, wherein said shroud plates extend beyond said terminating end of said bar and entirely around the periphery of said sprocket and for a radial distance with respect to the periphery thereof to guide the chain as set forth.

13. A chain saw structure as defined in claim 5, wherein each said shroud plate has flange edges extending beyond the grooved edges of said bar and away from the similarly extending adjacent edges of the other shroud plate.

14. A chain saw structure as defined in claim 6, wherein each said shroud plate has flange edges extending beyond the grooved edges of said bar and away from the similarly extending adjacent edges of the other shroud plate.

References Cited

UNITED STATES PATENTS

| | | | |
|---|---|---|---|
| 2,032,609 | 3/1936 | Arsneau | 143—32 |
| 2,827,932 | 3/1958 | Strunk | 143—32 |
| 2,910,100 | 10/1959 | Hoff et al. | 143—32 |
| 2,933,112 | 4/1960 | Bentley | 143—32 |
| 2,992,660 | 7/1961 | Merz | 143—32 |

DONALD R. SCHRAN, *Primary Examiner.*